(No Model.) 2 Sheets—Sheet 1.

A. A. VÉREL.
APPARATUS FOR APPLYING AND REMOVING WHEEL TIRES.

No. 601,088. Patented Mar. 22, 1898.

WITNESSES:
F. W. Wright
J. L. Connor

INVENTOR
ALPHONSO A. VEREL
BY
Howson and Howson
HIS ATTORNEYS.

(No Model.) 2 Sheets—Sheet 2.

A. A. VÉREL.
APPARATUS FOR APPLYING AND REMOVING WHEEL TIRES.

No. 601,088. Patented Mar. 22, 1898.

WITNESSES:
F. W. Wright.
S. C. Connor.

INVENTOR
ALPHONSO A. VÉREL
BY
Howson and Howson
HIS ATTORNEYS

UNITED STATES PATENT OFFICE.

ALPHONSO A. VÉREL, OF GLASGOW, SCOTLAND.

APPARATUS FOR APPLYING AND REMOVING WHEEL-TIRES.

SPECIFICATION forming part of Letters Patent No. 601,088, dated March 22, 1898.

Application filed December 20, 1897. Serial No. 662,587. (No model.) Patented in England May 23, 1896, No. 11,263.

*To all whom it may concern:*

Be it known that I, ALPHONSO ANTHONY VÉREL, a subject of the Queen of Great Britain and Ireland, and a resident of Glasgow, Scotland, have invented certain Improvements in Apparatus for Applying and Removing Wheel-Tires, (for which I have obtained British Patent No. 11,263, dated May 23, 1896,) of which the following is a specification.

My said invention has for its object to facilitate the application, removal, or changing of wheel-tires, being principally intended for use with solid or hollow tires of rubber or compounds or combinations thereof with other materials, but also applicable for metal tires.

The apparatus for applying and removing tires consists, essentially, of two changeable annular gripping-plates fixed adjustably to a base-framing and of two unequally-powered directly-opposing hydraulic cylinders held in the framing concentrically with the annular gripping-plates and having changeable holding-plates fixed to their rams, the annular gripping-plates being constructed to hold the tire and the ram-plates to hold the wheel, which is forced into the tire by the action of the larger-powered hydraulic cylinder.

In order that my said invention and the manner of performing the same may be properly understood, I hereunto append two sheets of explanatory drawings to be hereinafter referred to and showing my improved apparatus for applying and removing tires.

Figure 1:
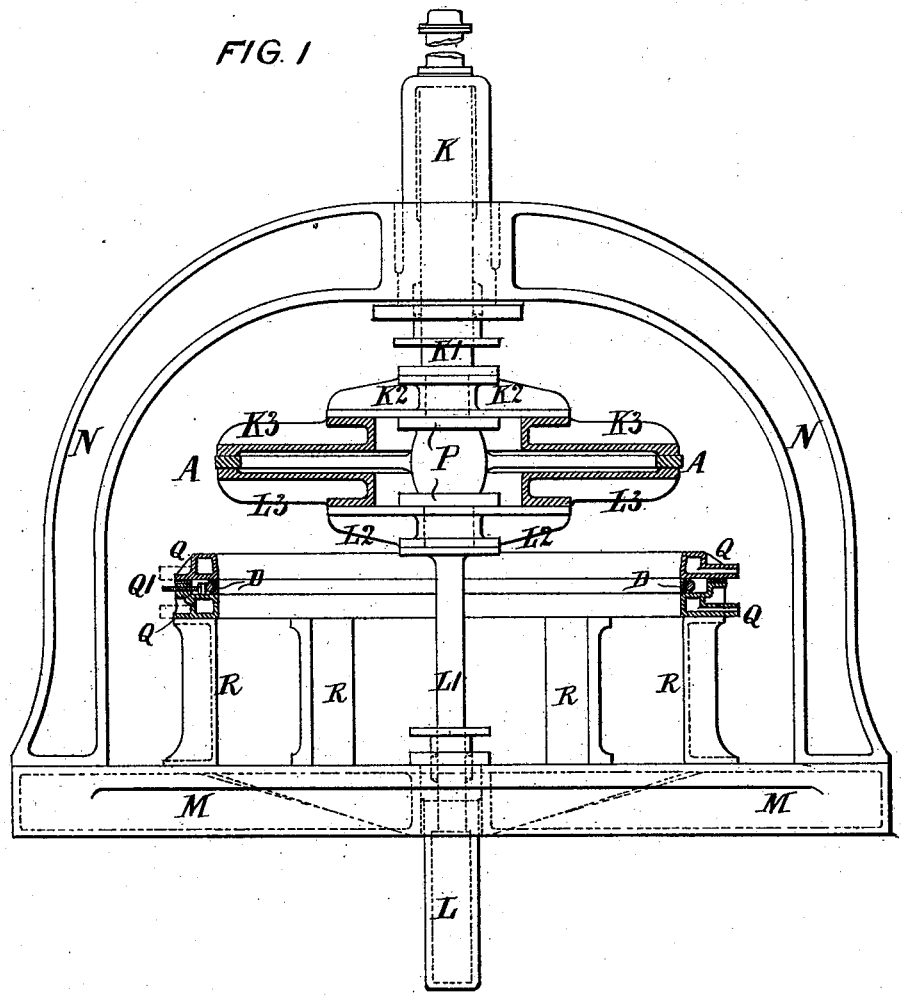
Figure 3:
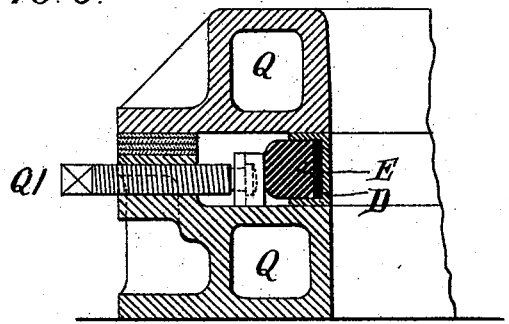
Figure 2:
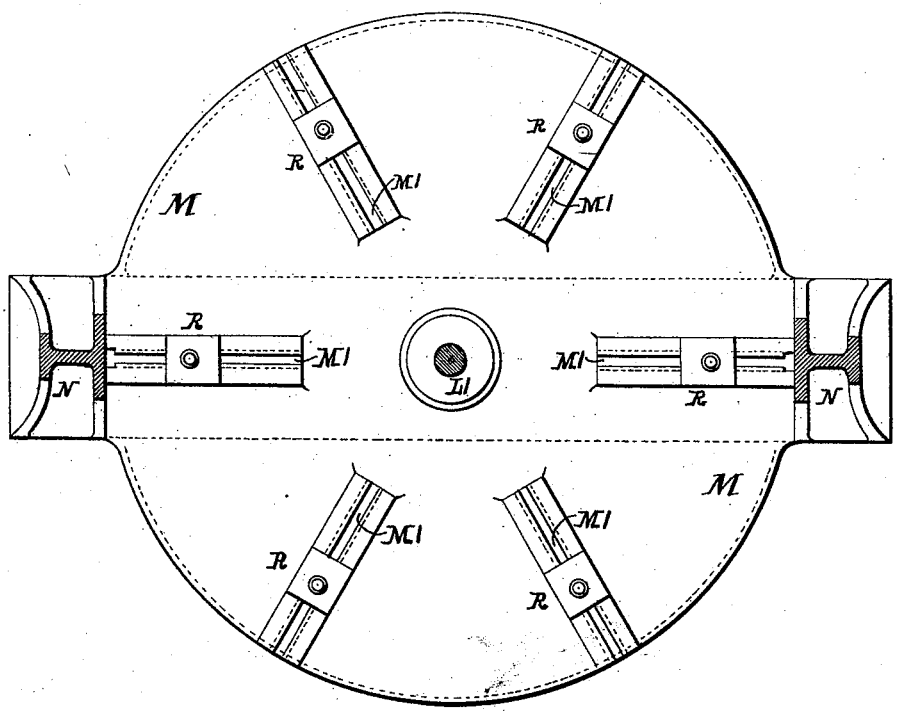
Figure 4:
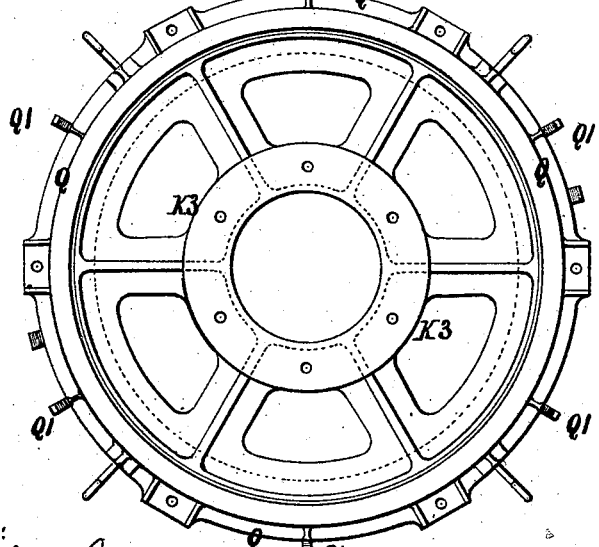

Figure 1 on Sheet 1 is a sectional elevation, and Fig. 2 on Sheet 2 is a horizontal section, of the improved apparatus for applying and removing the tires. Fig. 3 is an enlarged vertical section of a part of the annular gripping-rings. Fig. 4 is a plan of the holding-plates and the annular gripping-plates.

In the drawings the same reference-letters are used to mark the same or like parts wherever they are repeated.

The apparatus shown in the drawings comprises two hydraulic cylinders K and L, placed in the same vertical line, the lower one being fixed in a base-frame M and the upper one in an arched or other suitable frame N, fixed to the base-frame. The rams K' and L' of the cylinders K and L have fixed to them plates $K^2 L^2$, between which the wheel is held and which have fixed to them changeable holding-plates $K^3 L^3$ for the various sizes of wheels to be operated on. The felly or rim A of the wheel is firmly gripped by the outer parts of the holding-plates $K^3 L^3$, and the hub of the wheel is held tightly by packing-blocks P, placed between it and the ram-plates $K^2$ and $L^2$. The tire E to be applied is shown in the drawings as being of solid rubber held in a tire-ring D, and the tire and ring are held between two changeable annular gripping-plates Q, resting on standards R, capable of adjustment along slots M' in the base-frame M to and from the center to suit the various annular gripping-plates $K^3$ and $L^3$, provided for wheels of different sizes. When put together, the two annular gripping-plates Q present a groove on the inner side, and the tire E and tire-ring D are placed in this groove, the upper plate being lifted to admit it. The upper annular gripping-plate Q is made with its inner edge slightly tapered, the lower part being the more contracted and of the same diameter as the inside of the tire-ring D. The lower annular gripping-plate Q is provided with radial screws Q' for adjusting the gripped tire circumferentially. For a slight difference of size a thin metal band may be attached to the inner part of the upper annular gripping-plate Q.

The bottom hydraulic cylinder L is of a size suitable, with the water-pressure employed, for sufficiently gripping the wheel. The upper hydraulic cylinder K is larger, so as to combine with the lower cylinder L in gripping the wheel and in addition to move the gripped wheel downward with sufficient pressure to force it down through the upper annular gripping-plate Q and into the tire-ring D. The felly or rim A of the wheel is made slightly larger externally than the inside of the tire-ring D, and it becomes compressed in being forced down through the inner tapered surface of the upper annular gripping-plate Q, so that it fits the tire-ring with great tightness. Passages may be formed through the annular gripping-plates for the introduction of steam or other heating agent, if found beneficial.

What I claim as my invention is—

Apparatus for applying and removing wheel-tires consisting essentially of two changeable annular gripping-plates fixed adjustably to a base-framing and of two unequally-powered directly-opposing hydraulic cylinders held in the framing concentrically with the annular gripping-plates and having changeable holding-plates fixed to their rams, the said annular gripping-plates being constructed to hold the tire, and the ram-holding plates to hold the wheel which is forced into the tire by the action of the larger-powered hydraulic cylinder, substantially as hereinbefore described with reference to the accompanying drawings.

In testimony whereof I have signed my name to this specification in the presence of two subscribing witnesses.

ALPHONSO A. VÉREL.

Witnesses:
EDMUND HUNT,
DAVID FERGUSON.